Patented Feb. 8, 1927.

1,617,285

UNITED STATES PATENT OFFICE.

CHARLES H. DAVIS, OF CHESHIRE, CONNECTICUT, ASSIGNOR TO THE AMERICAN BRASS COMPANY, OF WATERBURY, CONNECTICUT, A CORPORATION OF CONNECTICUT.

GRANULAR BRAZING SOLDER AND METHOD OF PRODUCING THE SAME.

No Drawing. Application filed July 21, 1926. Serial No. 124,108.

My invention relates to granular brazing solder and the method of producing the same.

Granular brazing solder as heretofore known in the art is granular solder used for hard-soldering brass, bronze, copper, nickel-silver, iron, steel and the like, being heretofore composed of an alloy whose principal constituents were copper and zinc usually in approximately equal parts. The alloy, however, was sometimes made to contain small amounts of another metal, or metals, such as bismuth, lead, nickel or tin.

In manufacturing granular brazing solders heretofore known, the method employed has been to make a suitable alloy substantially free from oxides and then, at a proper temperature, reduce the same to granular form by hammering, crushing, rolling and the like, and then grade the particles by sifting or other means so as to obtain products of varying fineness. The copper in a copper-zinc solder so made, can not practically speaking, exceed a certain proportion, approximately 53%, since copper is a malleableizing metal and the alloy with a higher copper content would be so malleable that it would be difficult, if not impossible, to break it up so as to reduce it to granular form. If the copper in the granular solder does not exceed 53% and two pieces of brass containing say 65 to 75% copper are brazed together by it, the filling of the brazed seam is of a color noticeably redder than the color of the portions brazed together, so as to produce an objectionable appearance, unless, as is sometimes, but not usually done, sufficient heat is applied for a long enough period during the brazing operation to drive off a portion of the zinc so as to suitably increase the proportion of the copper in the seam. This extra operation of heat is a difficult step and uncertain in results, and moreover, when thin walls of brass are being brazed in this manner the heat is liable to injure the walls. If the copper content of the solder were sufficiently higher than 53% the brazed seam would match the brass without this special heat treatment and the seam would also be tougher and more malleable if free from oxides. My invention provides this higher copper content in granular brazing solder.

The desirability of such higher copper content in granular brazing solder has long been known and attempts have heretofore been made to secure it by subjecting the old granular solder to sufficient heat to drive off a portion of the zinc without destroying the granular form. While a granular solder with a higher copper content can be obtained in this way, the product is objectionable since it contains oxides of copper or zinc, or of both, which not only weaken the seam produced in brazing, rendering it more or less porous and less tough and malleable than if the oxide were not present, but also cause the granules to become discolored or blackened, so that the solder thus produced is less attractive in appearance.

One object of my invention is to provide a granular brazing solder which when used in the usual manner will produce a tougher and more malleable seam which will more closely match wrought yellow brass than granular solders now in use.

Another object of my invention is to produce granular brazing solder having a high copper content and substantially free from oxide. Another object of my invention is to produce a granular solder having a high cooper content, which when produced is bright and attractive in appearance.

Another object of my invention is to produce a new and improved granular solder which is copper color.

With brazing solder composed of a copper-zinc alloy containing another element such as a small proportion of bismuth, lead, nickel or tin, the presence of copper above a certain proportion made it difficult, if not impossible, to reduce such alloy to granular form. The granular copper-zinc solder containing such other element with such higher proportion of copper is at times desirable and my invention can be embodied in such solders and their manufacture.

The solder embodying my invention in its preferred form consists of granules of brazing solder, such for instance as solder heretofore produced by reducing to granular form a suitable alloy, the individual granules of which are in accordance with my invention coated with a layer of copper sufficient to bring the copper content of the mass up to the desired point. In other words, my new product in its preferred form consists of a granular brazing solder, the individual granules of which are copper coated granules of a suitable alloy.

In producing this improved solder I, in accordance with any known or suitable method for producing granular solder, produce a sub-divided mass of suitable alloy substantially free from oxide, and after such sub-divided product has been produced, and preferably after the granules of the various sizes have been separated out by sifting or otherwise so as to produce a plurality of products of varying degrees of fineness, coat the individual granules with metallic copper.

One suitable method for accomplishing this coating is to immerse the granular product in acid sulphate of copper agitating the same therein until the individual granules are thoroughly exposed to the solution and covered with copper deposited therefrom. If necessary, in order to obtain the desired amount of copper upon the granules, I subject them to another submersion in another bath of the acid sulphate of copper solution.

Where it is desired to have the brazed seams substantially match, in color, wrought brass containing from 65 to 75% of copper, I have found that satisfactory results are produced if the alloy is composed of substantially equal parts of copper and zinc, by weight, and the coating of copper is sufficient to raise the copper content of the mass to about 56%. According to the color of the brass to be brazed, however, the thickness of the copper coating may be varied so as to secure the necessary copper content.

In brazing pieces of brass having from 65 to 75% copper, it is highly desirable to have the copper content of the finished seam at least approximately 60%, so as to produce a substantially matching color, which percentage also produces a stronger and more ductile braze than a lower copper content. If the copper content of the brazing solder is about 56% the copper content of the braze, when brazing heat is applied in the ordinary manner, will be considerably higher on account of the volatilization of a portion of the zinc, which necessarily takes place in the brazing operation and changes the relative proportions of the constituents so as to bring the copper content of the seam to about 60%. The copper of the coating when heated during the brazing process takes up some of the zinc vapor, the same alloying therewith and combining with the original alloy portion so as to form a homogeneous alloy with an increased copper content. While the melting point of the solder with the increased copper content is slightly higher than the granular solder herefore used, it is not sufficiently higher to materially affect the use of the usual brazing methods in connection therewith.

While, when employing simple immersion, I preferably use acid sulphate of copper to obtain a copper coating on the granules, it may be obtained by immersing in an alkaline copper solution such as a slightly alkaline solution of copper ammonium chloride.

The copper coating can also be deposited upon the alloy granules electrolytically, the granules forming the cathode of a cell such as is commercially used for the electrolytical deposition of copper. In this case also the granular alloy should be agitated so that the granules will be sufficiently exposed to the electrolytical deposition action. When the electrolytic process is employed a coating of copper can obviously be made of the desired thickness.

After the copper coating is obtained in either manner, the granular solder is then thoroughly washed and dried, whereupon it is ready for use. The granular solder produced as above described is substantially free from oxide and embodies my invention in its preferred form.

My method may be employed in making any solder where it is desired to add a malleableizing metal to an amount such that, if incorporated in the alloy, the alloy would be difficult to reduce to granular form.

As will be evident to those skilled in the art, my invention permits various modifications without departing from the spirit thereof or the scope of the appended claims.

What I claim is:

1. A brazing solder consisting of granules of a suitable brazing alloy coated with a malleableizing metal.

2. A brazing solder consisting of granules of a copper-zinc alloy coated with copper.

3. The method of making a granular brazing solder which consists in reducing a mass of suitable alloy into granules and coating said granules with a malleableizing metal.

4. The method of making a granular brazing solder which consists in reducing a mass of suitable alloy containing zinc and copper into granules and coating said granules with copper.

In testimony whereof, I have signed my name to this specification this 20th day of July, 1926.

CHARLES H. DAVIS.